No. 705,363. Patented July 22, 1902.
F. KUGLER.
BOOK SEWING MACHINE.
(Application filed Feb. 19, 1900.)

(No Model.) 6 Sheets—Sheet 3.

Witnesses:
Anton Albeitzner
N. Mitchell

Inventor:
Friedrich Kugler,
by Max Small
Attorney.

No. 705,363. Patented July 22, 1902.
F. KUGLER.
BOOK SEWING MACHINE.
(Application filed Feb. 19, 1900.)
(No Model.) 6 Sheets—Sheet 4.

Witnesses: Inventor: Friedrich Kugler,

No. 705,363. Patented July 22, 1902.
F. KUGLER.
BOOK SEWING MACHINE.
(Application filed Feb. 19, 1900.)
(No Model.) 6 Sheets—Sheet 5.

Witnesses: Anton A. Glaetner. N. Mitchell.

Inventor: Friedrich Kugler, by Max Finzl, Attorney.

THE NORRIS PETERS CO., PHOTO-LITHO., WASHINGTON, D. C.

UNITED STATES PATENT OFFICE.

FRIEDRICH KUGLER, OF FRAUENFELD, SWITZERLAND, ASSIGNOR TO ACTIENGESELLSCHAFT, VORMALS F. MARTINI & CO., OF FRAUENFELD, SWITZERLAND, A FIRM.

BOOK-SEWING MACHINE.

SPECIFICATION forming part of Letters Patent No. 705,363, dated July 22, 1902.

Application filed February 19, 1900. Serial No. 5,715. (No model.)

*To all whom it may concern:*

Be it known that I, FRIEDRICH KUGLER, a subject of the Emperor of Germany, residing at Frauenfeld, Switzerland, have invented new and useful Improvements in Stitching-Machines, (for which I have filed patent applications in Switzerland on the 23d of November, 1899, No. 22,607; in France on the 9th of December, 1899, No. 283,243; in Germany on the 11th of December, 1899; in Austria on the 23d of December, 1899; in Hungary on the 30th of December, 1899, No. 19,801, and in Great Britain on the 9th of January, 1900, No. 562,) of which the following is a specification.

This invention relates to knot-tying devices for book-sewing machines. In apparatus according thereto there are two grippers that move toward each other, so that one end of a loop carried downward by a needle in stitching can be brought upward over a supporting-point by one of the grippers, while the other gripper can push the two closely-lying parts of the loop through the open loop end. One of the grippers can carry the end of the double loop thus moved or arranged by the grippers over an inserted stitching-thread end for the purpose of making a knot, which can then be drawn tight by other working parts.

An example of apparatus according to this invention is illustrated in the accompanying drawings, in which—

On the driving-shaft 1, located under the machine-frame, there are mounted cams 2, 3, 4, 5, 6, 7, and 15, which are adapted to impart the necessary working movements to the mechanism.

Figure 2:
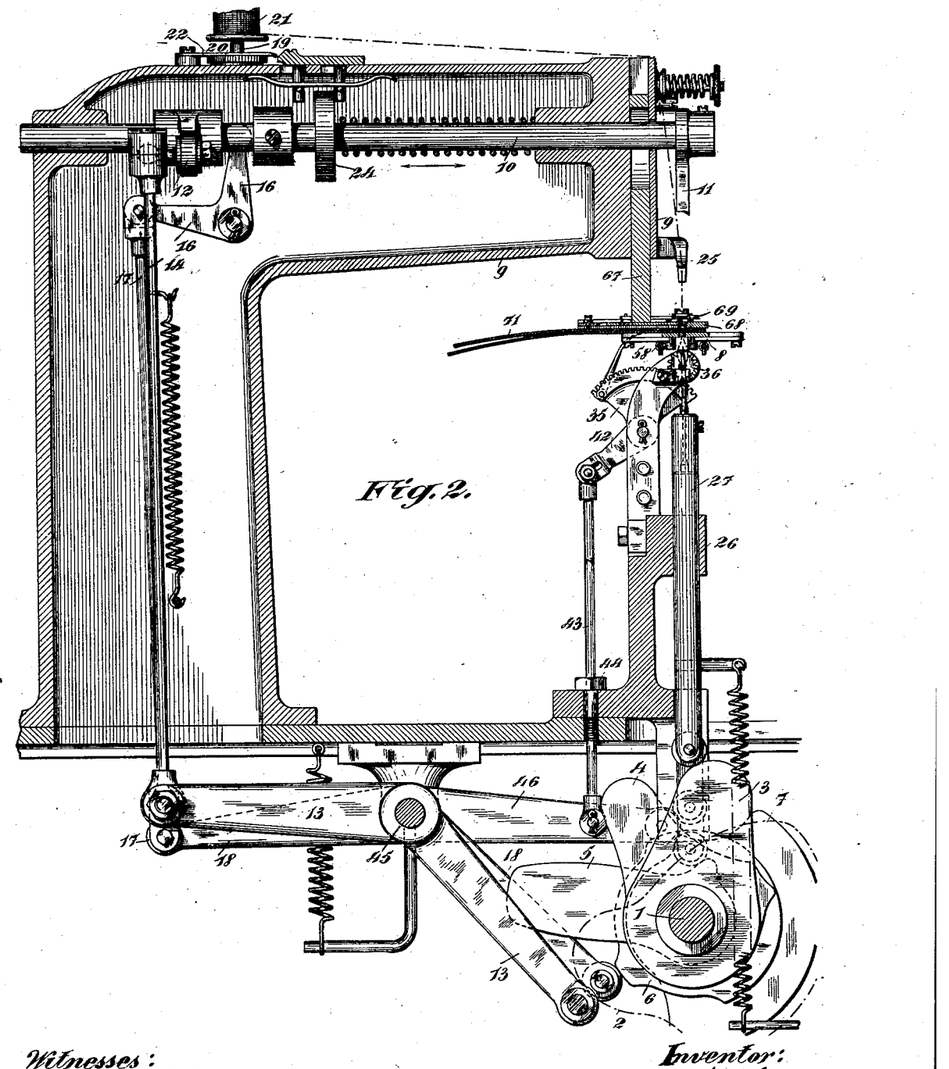
Fig. 2 is a vertical section corresponding to the line A A of Fig. 1.

The frame of the machine has a table 8, which serves as a rest for the objects to be stitched. Above the table there is bracket 9, in which an oscillating shaft 10 is mounted, which projects at one end from the bracket over the table and carries an arm 11, that can take part in the oscillations of the shaft in a vertical plane. A link 14 is connected at one end to a lateral arm 12 on the shaft. The other end of the link 14 is jointed to one arm of a two-arm vertically-oscillating lever 13 on a shaft 45. The other arm of this lever carries a roller which bears on the cam 2. One arm of a bell-crank lever 16, Fig. 2, engages in a groove between two collars mounted on the shaft 10, of which one carries the arm 12. A link 17 is connected to the other arm of the bell-crank lever. At the other end the link 17 is jointed to one arm of a vertically-oscillating two-arm lever 18, mounted on the shaft 45. The other arm of the lever 18 carries a roller which bears on the cam 6, which can effect a slight axial movement of the shaft 10 through the transmission mechanism, so that a hereinafter-mentioned tension device can be operated.

A vertical pin 19 is rotatably mounted on the bracket 9. This pin carries at the bottom a disk 20 and serves for carrying a thread-reel 21. A removable tension-spring 22 bears on the upper side of the disk. Its free end is bent downwardly somewhat, and a slide 23, Fig. 2, can (when it is moved) slide so that its tapered end passes under and raises the downwardly-bent end of the brake-spring, so as to cause it to cease to exert a braking effect on the disk 20, and consequently on the pin carrying the thread-reel. On the under side the slide has two pins which extend into the bracket and are located on both sides at a certain distance from a disk 24, mounted on the shaft 10. Now if the shaft 10 is moved in an axial direction the disk strikes either against one or the other of the pins, and thus causes the braking or allows the rotation of the pin 19, according to the direction in which the movement of the shaft occurs.

A thread-guide 25 is arranged laterally at the end of the bracket, while the end of the oscillating arm 11 is likewise adapted to guide the thread.

Below the table 8 three vertical needle-holders 27, 28, and 29 are mounted to slide vertically in a guide 26. The lower ends of the needle-holders each carry rollers which bear respectively on the three cams 3, 4, and 5, through the rotation of which in working they can obtain their vertical motion.

The needle-holder 28, located between the needle-holders 27 and 29, has on its surface a groove 30, resembling a quarter-turn of a screw-thread, in which a pin 31, secured to the guide 26, engages, by means of which when the needle-holder 28 slides vertically it is caused, during a particular part of the work to be described hereinafter, to make a quarter-revolution about its axis.

The needle-holders 27, 28, and 29 carry at their upper ends inserted needles 32, 33, and 34, with points resembling those of crochet-needles.

Figures 15, 16, 17:
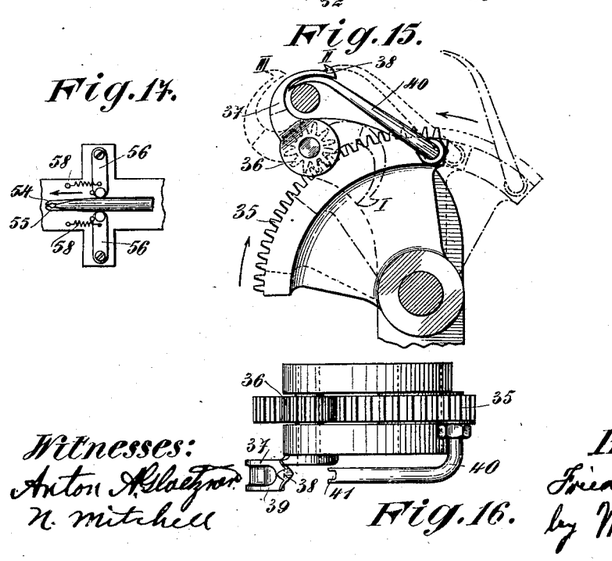
Figs. 15 and 16, detail side and plan views, respectively, of the grippers.
Figs. 17 and 18, detail views illustrating the mechanism for operating the jaws of the gripper-needle, and Figs. 19, 20, and 21 detail views showing the various positions of the thread and the grippers in the formation of a knot.

Between the needles 33 and 34 there is mounted a segment 35 of a toothed wheel that rocks about a horizontal axis and has its teeth directed upwardly. A pinion 36 engages therewith. This pinion carries a bent gripper 37, Figs. 15 and 16, that swings about a horizontal axis above the needle 34 and is provided at the outer end with a hook 38. The hook 38 has at both sides saddle-shaped recesses, and below the hook there is in the gripper a hole 39, which stops at a certain stage in the working in the path of the needle 34, so that the latter can pass therethrough.

On the toothed segment 35 there is a second gripper 40, which oscillates therewith and is adapted to engage with its curved front portion, that is provided with a forked end 41, at a certain stage in the working in the curved portion of the gripper 37. A lateral arm 42 of the toothed segment is jointed to one end of a link 43, which slides vertically through a bush 44. The lower end of the link is connected below to an arm 46, that oscillates about the shaft 45. The outer end of the arm 46 carries a roller which bears on the cam 7. The toothed segment can receive an oscillating motion through the cam 7 during the operation of the machine by means of the transmission mechanism, (arm 46, link 43, and arm 42.)

The needle 32 passes between a lateral bearing-piece 47 and a brake-piece 48, that is under the influence of a spring, and is mounted to swing on a horizontal axis between two laterally-projecting arms of the bearing-piece. A spring tends continually to draw the brake-piece 48 against the bearing-piece, so that when the machine is working and the needle passes from between the bearing-piece and the brake-piece the brake-piece bears against the bearing-piece.

In a lateral bracket 49 a gripper-needle 50 is mounted under the table 8 to slide horizontally and perpendicularly to the paths of the needles, so that its point can successively enter the paths of the needles 34, 33, and 32 and can leave the paths of the needles 32, 33, and 34 in the reverse direction.

The gripper-needle is connected to one arm of a two-arm lever 51. The other arm of this lever carries a roller which bears on the cam 15. The gripper-needle thereby receives its horizontal motion during the operation of the machine.

Each of the transmission mechanism under the influence of a cam is acted upon by a spring which causes the end part or roller to bear continually on the corresponding cam.

Figures 12, 13, 14:
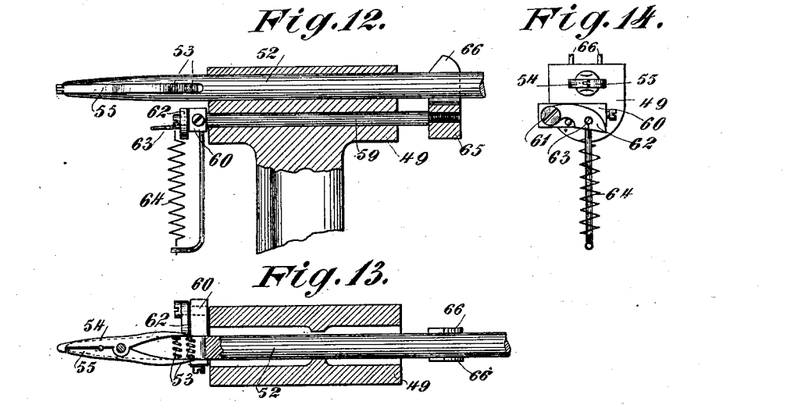
Figs. 12, 13, and 14 are detail views of the gripper-needle.

The gripper-needle comprises a spindle 52, Figs. 12, 13, and 14, which is forked at one end and has two jaws 54 and 55, which are held against each other by springs 53 and form the needle-point, and of which one, 54, embraces the point of the other, 55, with two lateral projections. The jaws 54 and 55 are two-arm levers, of which, as hereinbefore described, two arms constitute the point of the needle, while the springs 53 are compressed between the other two arms and press the arms that constitute the point of the needle against each other. The arms acted on by the springs are curved, so that they project laterally like excrescences from the fork of the spindle when the arms that constitute the point of the needle are held together. If, on the contrary, pressure is exerted externally on the curved arms, the point of the needle can be opened for a particular purpose.

Figure 18:
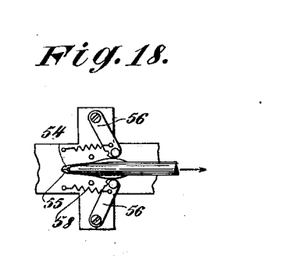

For the purpose of opening the point of the needle a device is arranged under the table 8. This device comprises two arms 56, whose free ends are opposite to each other, Figs. 1, 17, and 18, and between which the gripper-needle can enter during its forward movement, so that the free ends of the arms strike against the curved arms of the jaws 54 and 55. The arms 56 cannot move backwardly, however, because they abut against their pins 57. In consequence thereof they exert pressure on the curved arms, and when the gripper-needle passes through force the jaws 54 and 55, and consequently the needle-point formed thereby, to open. When the curved arms have passed through between the arms 56, the jaws 54 and 55 can again close. Upon the return stroke of the gripper-needle the arms 56 can be moved a certain distance by the curved and outwardly-projecting arms of the jaws 54 and 55 without exerting pressure on the latter, which would alter their relative position. The point of the needle therefore remains closed during the return stroke. After the gripper-needle leaves the arms 56 the latter can swing back and will again bear against the pins 57. For this purpose a spring 58 engages each arm 56 and draws it against the corresponding pin.

Under the gripper-needle in the bracket 49 a bolt 59 is mounted to slide horizontally and parallel to the gripper-needle spindle, but only within narrow limits. The end of the bolt directed toward the point of the gripper-needle spindle carries a piece 60, Figs. 12, 13, and 14, on which there is arranged an arm 62, that swings about a screw 61. The arm 62 abuts against a pin attached to the piece 60. The arm 62 carries a pin 63, which projects toward the needles 34, 33, and 32 and is acted upon by a spring 64, that tends to draw the arm 62 downwardly against the abutment. At the other end the bolt 59 has a head 65, with two lateral upwardly-extending flat springs 66, which embrace the spindle of the gripper-needle between them. The head 65 and the piece 60 limit the axial movement of the bolt 59. The movement of the bolt 59 can be effected by the movement of the gripper-needle, since when the gripper-needle moves the bolt is carried therewith by means of the flat springs 66, that bear against the gripper-needle, until either the head 65 or the piece 60 bears against the bracket 49, according to the direction in which the movement takes place. When the head 65 or the piece 60 bears against the bracket 49, the gripper-needle can nevertheless slide between the flat springs 66 with friction.

Figure 1:
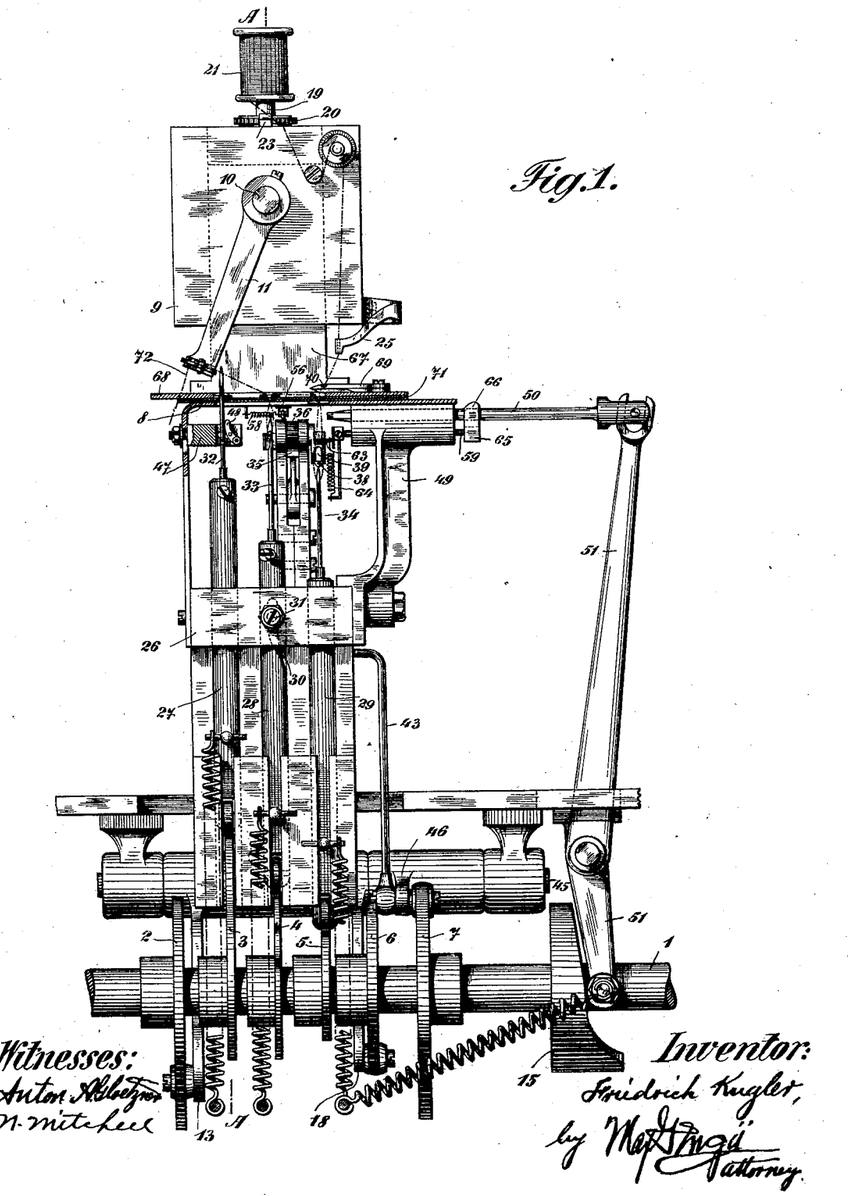
Figure 1 shows a thread-stitching machine provided with apparatus according to this invention in vertical section. Unessential parts are omitted therefrom.

At the end of the bracket 9 there is provided a vertically-movable sliding plate 67, which carries a pressure-plate 68, that bears against the table 8. On the pressure-plate 68 there is arranged a thread-cutting device of the kind usual in such machines in the form of shears 69, which are operated in a known manner and between the blades of which the stitching-thread can be led from the thread-guide 25, while a pin 70, Fig. 1, is provided on one of the blades to prevent the thread from slipping out of the opening of the blades.

Figure 3:
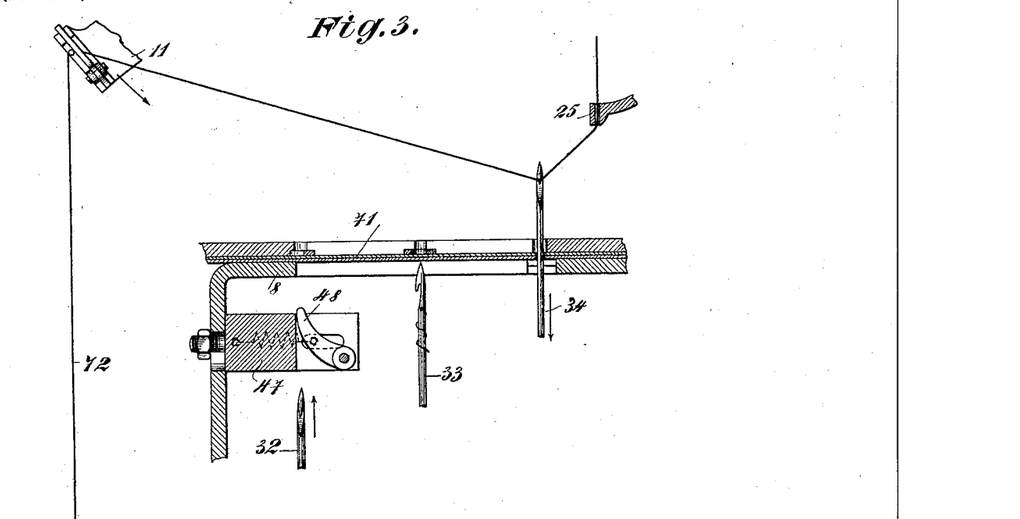
Figs. 3, 4, 5, 6, 7, and 8 show various working positions.
Figure 4:
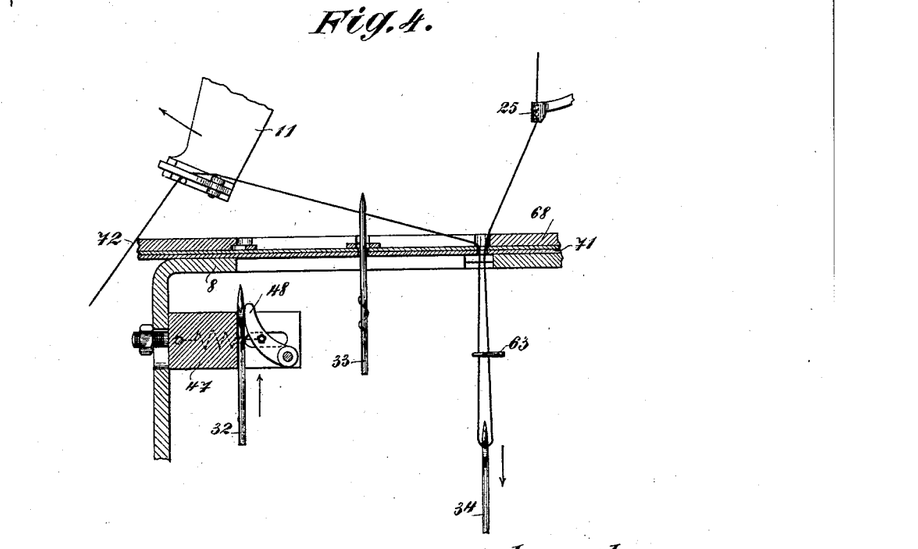
Figure 5:
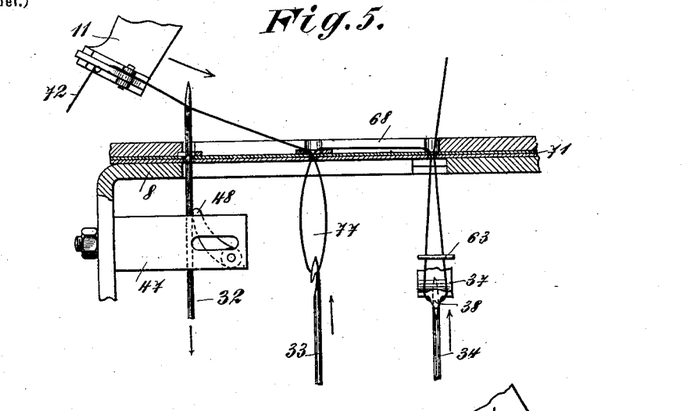
Figure 6:
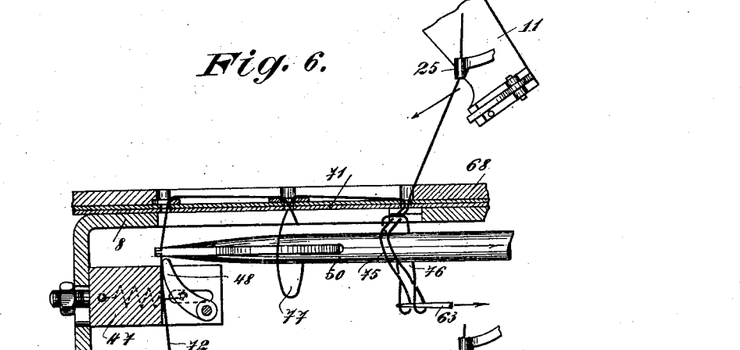
Figure 7:
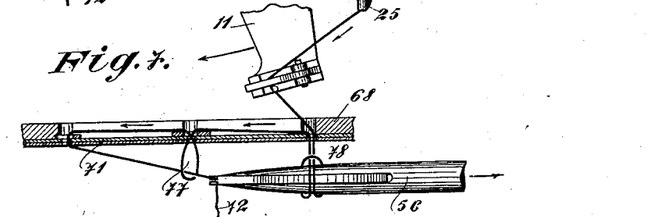
Figure 8:
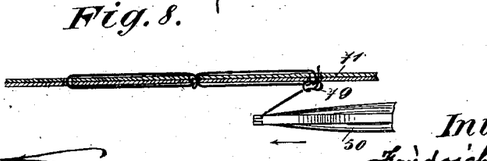
Figure 19:
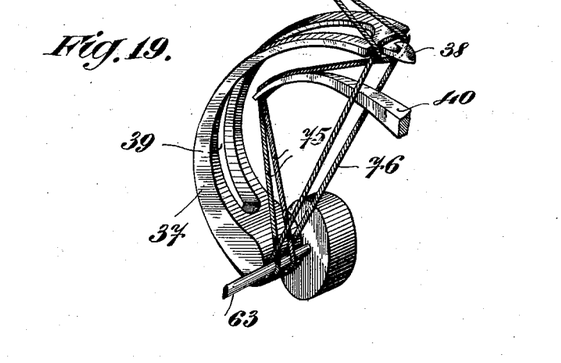
Figure 20:
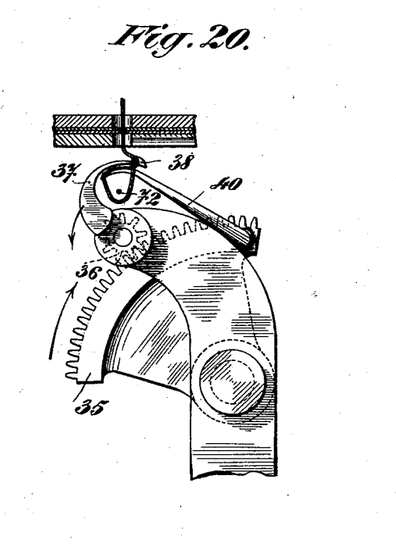
Figure 21:
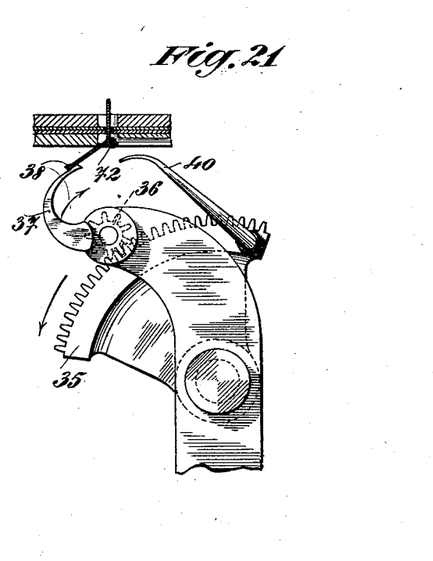

The mode of operation of the machine hereinbefore described may take place in the following manner. A pile 71 of paper to be stitched is laid on the table 8 and is prevented from moving thereon by the pressure-plate. The arm 11 was swung to the side at a previous stitching, and the end of the stitching-thread 72 hangs down from the arm 11 to the length proper for the stitching to be performed, Fig. 3. The pin of the thread-reel 21 is braked, and consequently the thread cannot unwind from the latter. The stitching-thread drawn out is sufficient for the following operation. The needles 34, 33, and 32 are moved upwardly in succession by the cams in combination therewith. After the needle 34 is forced through the pile of paper the arm 11 makes a movement downward, so that the thread lies against the same. Upon the downward movement of the needle 34 the latter catches the said thread and draws it downward, while at the same time the arm 11 makes a small movement in the direction of the arrow, Fig. 3, in order to slacken the thread, whereby a loop is formed in the thread by the needle 34, as shown in Fig. 4. By this time the needle 33 has also passed through the pile of paper, as shown in Fig. 4, after which it catches the thread which is laid against it by the forward movement of the arm 11, which then moves in the direction of the arrow, Fig. 5, to slacken the thread, which is then drawn down through the pile of paper and below the same. While moving downward the needle 33 and its holder are given one-fourth of a revolution, and in this way is formed a loop 77 in the piece of thread which is drawn through the paper, said loop being turned at right angles to the direction of the length of the book being stitched. This loop is released by the needle 33 by a slight upward movement of the latter. (See Fig. 5.) During this operation the needle 32 passes through the pile of paper and also catches the stitching-thread and draws all the remaining portion from the arm 11 and downwardly through the pile of paper between the bearing-piece 47 and the brake-piece 48, Fig. 6. The latter exerts a slight braking action on the stitching-thread for the further progress of the stitching. During this time the gripper-needle has been set into motion toward the needles and has taken the bolt with the pin with it for a short distance. The pin 63 has stopped in front of the loop pulled through by the needle 34, and it remains so for a time, Fig. 4. After the pin 63 has reached this position the gripper 37 swings from behind against the loop and catches it with its hook, (position I, Fig. 15,) while the loop is simultaneously fixed in the saddles on the two sides of the hook, Fig. 5. The needle 34 also moves slightly upward and enters the hole 39 in the gripper. The object of this movement of the needle is to free the loop end from the needle and to cause it to lie completely in the hook on the gripper. When this is done, the gripper swings farther forward with the loop and lays the end of the loop around the pin 63, (position II, Fig. 15.) Meanwhile the other gripper 40 has arrived under the gripper 37 and has caught with its forked end the two parts of the loop 75, leading to the pin 63, and pushed them through the more widely separated parts of the end of the loop 76, brought upward over the pin 63 by the gripper 37, Fig. 19. In this manner a double loop has been formed, which is kept open in the path of the gripper-needle 50, which passes therethrough on its forward movement. The gripper-needle does the same again with the loop 77, formed by the turning of the needle 33. Thereupon the point of the gripper-needle is opened in the manner hereinbefore described and catches the part of the end of the stitching-thread over the brake-piece 48 between its jaws, which close again, and the gripper-needle begins its return stroke. During its return stroke the gripper-needle causes also the return of the bolt (connected thereto by means of the aforesaid flat springs) with the pin 63, from which the double loop is then freed, Fig. 20. During the return stroke of the gripper-needle the end of the thread is first drawn through the loop 77 and then through the double loop 78, Fig. 7. When this has occurred, the gripper 37 makes a small return movement, so that the loop end held by its hook is raised above the thread end passed through. The gripper-needle, which still holds the end of the thread firmly clamped in its jaws, now moves forward, and thereby draws tight the so-called "straight knot" 79, Fig. 8, formed from the double loop 78 in the manner hereinbefore described. After the straight knot is drawn tight the gripper-needle returns to the starting position.

Figures 9, 10:
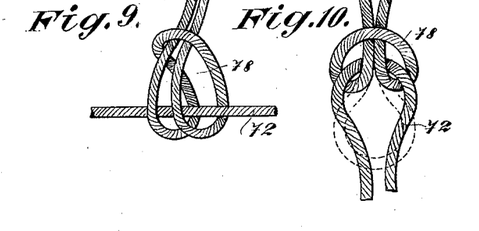
Figs. 9, 10, and 11 show in succession the formation of the knot.
Figure 11:
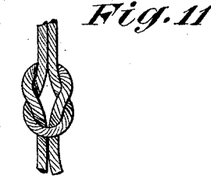

Figs. 9, 10, and 11 show the gradual formation of the straight knot. Fig. 9 shows the double loop with the end of the thread passed therethrough. In Fig. 10 the end of the thread is shown laid back, and in Fig. 11 the end of the loop from which the double loop is formed is brought over the thread end that is laid back and forms a loop.

When the straight knot is completed, the stitching is finished. With an axial movement of the shaft 10 the braking of the pin for the thread-reel ceases, the brake-spring 22 being raised by the slide 23, as hereinbefore described. The arm 11 swings back into the starting position, Fig. 3, thus moving back past the thread without touching the same. After reaching its farthest position to the right it then moves forward again, and thus comes behind the thread, which then lies in the path of the end of said arm 11. When now the arm 11 moves from the right toward the left, it catches the thread in the jaws formed in the end of the arm 11 by a tongue pivoted to the end of the arm and pressed against a part of said arm by a suitable spring. The thread is forced to enter said jaws, the tongue closing automatically to hold the thread, but with a very light frictional grip, so that in the further movement of the arm 11 the thread which is drawn off the spool can run easily between the jaws of the arm 11. When the proper length of thread has been drawn off and the stitching has been completed, the shears 69 operate to cut off the thread extending from the spool to the sewed paper, which thread normally runs through the open jaws of the said shears. The working parts of the machine are then in position for commencing a new stitching.

What I claim as my invention, and desire to secure by Letters Patent, is—

1. In a book-sewing machine, the combination with a hook-needle, a thread-supporting device, and a gripper, of means for operating the hook-needle and the gripper so that the gripper takes from the needle the thread-loop formed by said needle and draws the same up and over the thread-supporting device, a second gripper, mechanism for moving the same against the first gripper whereby the standing parts of the thread are pushed between the loop drawn up by the first gripper and a double loop is formed, means for drawing down a locking-thread, and means for passing the locking-thread through the said double loop.

2. In a book-sewing machine, the combination with the needle mechanism, of two grippers, and a toothed segment upon which one of the grippers is secured, of a pinion engaging said segment, to which pinion the other gripper is secured, and means for moving said segment about its axis, whereby the grippers are moved in opposition to each other to form a double loop, and means for drawing the thread through said double loop, substantially as described.

3. In a book-sewing machine, the combination with a hook-needle, means for drawing down a locking-thread, a thread-supporting device, two grippers, and means for moving the grippers in opposition to each other and reciprocating the hook-needle to form a double loop around the thread-supporting device, of means for withdrawing the thread-supporting device from the loop, whereby the latter is set free, and means for simultaneously drawing the locking-thread through the loop.

4. In a book-sewing machine, the combination with the thread-supporting device, a hook-needle, means for taking the thread from the hook-needle and winding it around the thread-supporting device to form a double loop, means for drawing down a locking-thread, a gripper-needle, and means for moving the latter to and fro through said double loop, of a bolt on which the thread-supporting device is mounted, plate-springs on the bolt in frictional contact with the gripper-needle, whereby the movement of said needle tends to cause a movement of the bolt, and stop devices for limiting such movement of the bolt.

5. In a book-sewing machine, the combination with a needle mechanism, a thread-supporting device, and a gripper with a hook on its end and projections at each side of the same, of means for moving the needle and the gripper so that the projections of the gripper will take up the end of the loop from the needle and draw the same around the thread-supporting device to form a double loop and will cause the hook of the gripper to draw back the loop end upon the completion of the knot formation and means to draw a locking-thread through the double loop.

6. In a book-sewing machine, the combination with a knot-forming device, a rotatable carrier for the thread-spool, and a tension-spring adapted to bear on said carrier to hold the same stationary, of a slide adapted to engage under the end of the spring to lift it from the carrier, and means actuated by the knot-forming device to operate said slide.

7. In a book-sewing machine, the combination with a knot-forming device, a rotatable carrier for the thread-spool, a tension-spring for said spool-carrier, a slide having two studs, a shaft, a disk on the shaft and projecting between the two studs, and means actuated by the knot-forming device for moving said shaft axially, whereby the slide releases the spring from the rotatable carrier.

In testimony whereof I have signed my name to this specification in the presence of two subscribing witnesses.

FRIEDRICH KUGLER.

Witnesses:
 MORITZ VEITH,
 A. LIEBERKNECHT.